United States Patent [19]

Stentiford

[11] Patent Number: 4,817,171
[45] Date of Patent: Mar. 28, 1989

[54] PATTERN RECOGNITION SYSTEM

[75] Inventor: Frederick W. M. Stentiford, Woodbridge, United Kingdom

[73] Assignee: British Telecommunications public limited company, Great Britain

[21] Appl. No.: 721,402

[22] Filed: Apr. 9, 1985

[30] Foreign Application Priority Data

Apr. 10, 1984 [GB] United Kingdom ............ 8409196

[51] Int. Cl.⁴ ............................................. G06K 9/34
[52] U.S. Cl. ...................................... 382/19; 382/30; 382/34
[58] Field of Search ............... 382/19, 23, 25, 30, 382/34, 14, 15, 16, 36, 38; 358/263

[56] References Cited

U.S. PATENT DOCUMENTS

| | | |
|---|---|---|
| 3,303,466 | 2/1967 | Holt . |
| 3,519,990 | 7/1970 | Holt . |
| 3,603,930 | 9/1971 | Britt ............................. 382/19 |
| 3,603,931 | 9/1971 | Britt et al. ..................... 382/19 |
| 3,717,848 | 2/1973 | Irvin et al. .................... 382/30 |
| 3,810,093 | 5/1974 | Yasuda et al. ................. 382/35 |
| 3,878,509 | 5/1975 | Kikuchi et al. ................ 382/45 |
| 4,027,284 | 5/1977 | Hoshino et al. ............... 382/33 |
| 4,110,737 | 8/1978 | Fahey et al. .................. 382/30 |
| 4,119,946 | 10/1978 | Taylor .......................... 382/30 |
| 4,153,897 | 5/1979 | Yasuda et al. ................. 382/30 |
| 4,379,283 | 4/1983 | Ito et al. ....................... 382/27 |
| 4,596,038 | 6/1986 | Yoshida ........................ 382/30 |

OTHER PUBLICATIONS

IEE Conference on Patent Recognition, 1986, "A Practical Technique for Feature Detection"—R. H. Britt, pp. 347–354.
IBM Journal—Jan. 1963—"Computer Automated Design of Multi-Font Print Recognition Logic'"—Kamentsky and Liu.
Optical Character Recognition (Spartan Books, 1962), "Some Important Factors in the Practical Utilization of OCR Readers"—Greanias.
IRE Transactions of Information Theory, vol. IT-8, No. 2, Feb. 1962, J. J. Leimer: "Design Factors in the Development of an Optical Character Recognition Machine", pp. 167-171.
The IBM 1975 Optical Page Reader, Part 1: System Design by R. B. Hennis, dated Sep. 1968, pp. 346-353.
Proceedings of the 4th International Joint Conference on Pattern Recognition, Nov. 7-10, 1978, Kyoto (JP), H. Fujisawa et al.: "Development of a Kanji OCR: An Optical Chinese Character Reader", pp. 817-820.
IEEE Transactions of Electronic Computer, vol. EC-13, No. 5, Oct. 1964, C. N. Liu: "A Programmed Alogorithm for Designing Multi-Font Character Recognition Logics", p. 589.

Primary Examiner—Leo H. Boudreau
Assistant Examiner—Jose L. Couso
Attorney, Agent, or Firm—Nixon & Vanderhye

[57] ABSTRACT

A pattern recognition system comprising pattern scanning data input means (1), a dichotomizing device (3), a feature matching device (5), a label assignment circuit (7) and a syntactic decision processing device (9). The label assignment circuit assigns labels and confidence measures to data corresponding to successive areas of the pattern. The syntactic decision processing device (9) comprises a buffer for storing area values comprising positional information, corresponding labels and confidence measures for adjacent areas in the pattern forming a two dimensional array and also comprises decision means for outputting labels and positional information for those areas whose confidence measures form two dimensional maxima with respect to those for neighboring areas in the array. The system may operate continuously as area values corresponding to successive portions of input data are added to the buffer.

18 Claims, 7 Drawing Sheets

03568
CDEGH
MNSUZ

CHARACTER MATCHES

12479
ABFJK
LPQRT
VWXY

*Fig.3.*

CHARACTER MISMATCHES

Fig. 7.  FUNCTIONAL FLOWCHART FOR SYNTACTIC PROCESSING DEVICE

Fig.8.

PATTERN RECOGNITION SYSTEM

This invention relates to a pattern recognition system. Pattern recognition systems can be used in many applications where patterns and in particular two dimensional patterns have to be recognized automatically. Particular applications are in optical character recognition systems where two dimensional visual patterns are recognized. Throughout this specification particular reference will be made to optical character recognition systems. The present invention however is equally appicable to any two dimensional pattern recognition problem.

In conventional pattern recognition systems the actual process of recognition is normally preceded by various pattern preprocessing stages. These may take a number of forms such as noise filtering, redundancy removal, normalization of size and in particular segmentation of the pattern in time or space. The aim of these stages is to present the pattern to be recognized to the recognition system in a way in which the chances of the machine correctly recognizing the pattern are increased. These stages though, add considerably to the cost and complexity of the system. Furthermore they often in themselves induce misrecognitions which would not otherwise have occurred.

Pattern segmentation is one of the most common preprocessing stages used. The use of segmentation is particularly common in optical character recognition where many systems are only able to recognize characters with any useful speed or accuracy which are presented to them in a predetermined neatly boxed manner. All systems use vertical segmentation of lines of text both to reduce the quantity of data to be processed and to assist recognition. However, the problems of contiguous characters, characters out of line with other characters, characters not spaced at normal pitch positions and skewed lines of text on a document, often render the task of segmentation itself very difficult resulting in many misrecognitions.

Segmentation has been extensively used though. In the IBM 1975 optical page reader (described in IBM J Res.Develop. Sept. 1968) the use of segmented characters was considered important. Segmentation was carried out on the basis of average distances between characters and from the distances between the start of one character and the next. Many other segmentation methods exist. Blank spaces between characters or calculations of the average pitch are often used to segment characters. In some systems use is made of tentative correlation signals between scanned data and reference data. This may be used to provide a trigger signal for the commencement of a set series of comparisons between sample data from a line of text and reference data, the best of which gives the label for the corresponding text area on that line. Such a system is described in U.S. Pat. No. 3,303,466.

Alternatively correlation signals between sample data from a portion of a line of text and reference data are used to assign labels to those positions on the line indicated by optimum correlation signals at expected constant pitch positions derived from the correlation signals for successive small portions of the line of text. Such a system is described in U.S. Pat. No. 3,519,990.

None of the prior art systems though, have shown a system which needs no form of vertical or horizontal segmentation and which can still operate continuously if required, while recognizing characters which may be both horizontally and vertically out of place with respect to their expected positions. The prior art systems will not work well for variable pitch print, skewed lines of text or documents with print not in rows. Furthermore, I have realized that even if systems according to the prior art could be made to operate in a continuous manner there would remain the problem that either such systems would not be discriminatory enough and would recognize a plurality of characters in closely adjacent positions where only one character was present or would be too discriminatory and fail to recognize characters which were present.

The methods used in the prior art to recognize characters are numerous. Usually segmented patterns to be recognized are binarized and passed through a shift register which action in effect corresponds to a matrix of cells being scanned over the segmented character. Detectors are connected to the various cells of the register in order to detect the presence or absence of black or white bits in the register as the character data is passed through the register. The detectors, which may take the form of AND gates with inputs connected to various cells, then detect the presence of features in the scanned character or match the scanned character with templates.

In the case of template matching the segmented character is compared with data representing a series of standard characters and is recognized as that which it most resembles. One problem with the segmentation of characters is that the segment selected for comparison often has the character to be recognized misplaced within it. This can result in misrecognition. One solution to this problem which has been adopted to take a slightly larger segment and to then effectively move each of the standard characters around the segment to find the "best fit" or maximum similarity for each standard character. The segmented character is then recognized as the standard character having the highest similarity of all the standard characters. Such a system is described for example in U.S. Pat. No. 4,153,897. The use of such a method though entails the repititious calculation and comparison of a large number of similarity measures. Furthermore such methods involving relative movement of standard and sample patterns are inherently unsuitable to continuous operation since the relative movement operation required before recognition occurs takes an appreciable length of time in comparison with the rate of sampling.

Character recognition by feature detection depends on the detection of features in a pattern and comparison of the feature response of the pattern with known reference feature responses (reference vectors) for classes of characters or individual characters. The features usually comprise the presence or absence of black or white bits in particular cells of the matrix through which the character data to be recognized is passed. By formulation of an appropriate set of features and an appropriate set of reference vectors it is possible to use them to assign labels to the data passed through the register. If data representing an area of text is passed entirely through the matrix and the feature detectors read afterwards the detectors will each only have detected the presence of their particular feature somewhere in the area of text. The features are not therefore fixed relative to one another. If, however, the feature detectors are read simultaneously at each step of the data through the register not only can the data be passed through the register in a continuous stream but the features will also be fixed relative to each other. An example of the latter form of feature detection occurs in the IBM 1418 Optical Character Reader. The machine makes use of a shift register together with the insertion of blank pixels to enable the area of text which is passing through the matrix to be scanned in all possible positions relative to the feature detectors. Thus to a certain extent the misplacing of a character to be recognized within a sample segment of data passing through the shift register can be compensated for by trying all possible matches between the sample segment and the matrix of feature detectors (which represents the same pattern area as the sample segment) with any degree of overlap between the two. However such machines still use some form of segmentation of the characters to facilitate recognition; for example, by detecting a minimum number of black bits in the "window" covered by the matrix. Furthermore such machines would not work if the form of segmentation they use were omitted since, as mentioned above, they would then suffer from either being too discriminatory or not discriminatory enough in recognizing characters presented to them.

None of the prior art methods thus allow truly continuous recognition in the sense of recognizing all the input data fed into the system in a continuous process. All, rely in some way or other on segmentation or some similar preprocessing step before labels are assigned to areas of text or pattern; or they reject vertically misaligned characters because recognition is only carried out on one predetermined line of text at a time.

According to the present invention there is provided a pattern recognition system comprising means for the input of electronic data corresponding to a two dimensional pattern to be recognized, analysis means for analyzing successive portions of said data corresponding to successive areas of said pattern and for assigning to each of said areas, in dependence on the corresponding portion of data, a corresponding one of a reference set of labels and a corresponding confidence measure indicating a degree of confidence in the assignment of the corresponding label; buffer means for storing area values corresponding to a plurality of said successive areas forming a two dimensional array of neighboring areas, said area values comprising for each of said neighboring areas, positional information defining the position of the area in said two dimensional pattern and said label and corresponding confidence measure assigned to the area by said analysis means and decision means for outputting as electronic signals, labels and positional information corresponding to those areas in said two dimensional array of neighboring areas whose corresponding confidence measures indicate a confidence in the correct assignment of their corresponding labels which is in a predetermined relationship with that indicated by each of the confidence measures corresponding to labels assigned to a two dimensional sub-array of neighboring areas in said array.

The use of a buffer for storing area values in which the labels have already been assigned to the areas in a two dimensional array before output decisions are made enables the system to operate continuously without any need for segmentation and without the need to search for similarity maxima with respect to each of a number of reference patterns for each segmented area of the pattern. Since the decision made by the decision means depends on the relative values of the confidence measures for adjacent areas rather than the absolute confidence measure in respect of each area the system is far less susceptible to being either too discriminatory or not discriminatory enough in locating recognized characters while still being able to operate in a continuous fashion. Furthermore since the buffer stores area values for a two dimensional array of areas and the system can operate continuously without the need for segmentation; the recognition of misaligned or skewed characters in optical character recognition is considerably easier since correct vertical and horizontal alignment of the characters is no longer necessary.

The decision means may output labels for areas having a confidence in their label assignment which in each case is greater than or equal to that for labels assigned to some areas of a two dimensional sub-array of neighboring areas and which is greater than that for labels assigned to the other areas of the two dimensional sub-array of neighboring areas. This enables the beginning of an inflexion in the confidence contour map provided by the area values for neighboring areas to be rejected in favor of a possible peak in the confidence contour which has yet to be detected.

The decision means may alternatively only output labels for areas having a confidence in their label assignments which in each case is greater than that for labels assigned to areas of a two dimensional sub-array of neighboring areas or which is greater than or equal to that for labels assigned to areas of a two dimensional sub-array of neighboring areas.

Preferably the sub-array of neighboring areas whose confidence measures are studied comprise immediately adjacent overlapping areas. This facilitates the study of the entire contents of a page of characters in use of the system for optical character recognition without any segmentation.

The two dimensional pattern may comprise layers of areas and in this case the buffer may contain area values for at least three such layers. The areas of the two dimensional pattern may each be specified by positional information comprising an X coordinate and a Y coordinate. In this case, if the decision means is to decide whether to output a label and positional information for an area $(X,Y)$ the two dimensional sub-array of areas whose confidence measures are studied are the eight surrounding areas $(X\pm 1, Y\pm 1)$ $(X, Y\pm 1)$ $(X\pm 1, Y)$. The system may operate continuously if the decision means makes decisions about areas $(X,Y)$ immediately after area values for the area $(X+1, Y+1)$ have been entered into the buffer, area values for layers Y and $Y-1$ already being in the buffer.

The buffer may contain area values for at least five layers of areas. In this event decisions about outputting labels in respect of an area $(X,Y)$ may be made once area values for the area $(X+2, Y+2)$ have been entered in the buffer, area values for layers $(Y+1)$, Y, $(Y-1)$ and $(Y-2)$ already being in the buffer. The decision made by the decision means in this case may be based on the area values for a sub-array of neighbouring areas comprising areas with positions $(X\pm 2, Y\pm 2)$ $(X\pm 1, Y\pm 2)$ $(X, Y\pm 2)$ $(X\pm 2, Y\pm 1)$ $(X\pm 2, Y)$ as well as $(X\pm 1, Y\pm 1)$ $(X, Y\pm 1)$ and $(X\pm 1, Y)$.

If the buffer contains area values for at least five layers of areas then a decision about whether to output a label for an area $(X,Y)$ based on areas $(X\pm 1, Y\pm 1)$ $(X, Y\pm 1)$ and $(X\pm 1, Y)$ may be preceded by the area $(X,Y)$ being chosen from a column of five areas having the same X coordinate as that area whose confidence in the assignment of its corresponding label is greatest.

The next column of five areas to be studied in this case may be centred on the area (X+1,Y). A column of five areas is thus first searched for a confidence maxima and once this is found the surrounding eight areas are inspected to see whether the area is a two dimensional maxima. Following this an adjacent column of five areas is inspected for confidence maxima which is centred on the area adjacent the maxima found in the column just searched. If the number of layers of areas in the buffer is greater than the variation in vertical alignment of characters on a line due to skew or other variables and the start position of the search is determined for each line by a prerecognition line search in which line scans are searched for data to determine the vertical start position; then this method can reduce the amount of data to be processed. This is because the system will then hunt along lines of characters rather than trawling all possible positions on a document for characters by looking at every possible area.

The analysis means may comprise a shift register, having a number of cells to various sets of which are connected feature detectors which are read simultaneously at each step of the data through the register. A register arranged in this way enables the features to be detected to be fixed relative to each other. This enables the feature detection to occur continuously as data is fed through the register rather than in a segmented fashion as occurs when the feature detectors are only read after segmented areas of text have each been passed through the register.

Furthermore by using continuous feature detection in combination with the buffer means, the whole recognition system may operate continuously. When operating continuously data is input to the system, passed through the analysis means and a succession of corresponding area values stored in the buffer, while at the same time the decision means is able to study successive area values in the buffer and output labels based simply on a study of the confidence measures for all immediately neighboring areas. This is something which is not and could not be done by any of the prior art systems.

The analysis means may further comprise means for comparing the feature response of all the feature detectors with a set of reference vectors each associated with a particular label so as to assign the label whose reference vector most closely matches the feature response of the data in the shift register to the corresponding area, together with a confidence measure, at each step of the data through the register. The use of features fixed relative to one another and of reference vectors considerably facilitates the recognition of characters and the rejection of intercharacter contiguities which enables the system to operate continuously more effectively than if features in the form of templates were used.

The register cells of the shift register used in the analysis means may have feature detectors attached to differing portions of the register such that the features are not relatively fixed to each other when detecting features simultaneously in a portion of data passing through the register. In this event though the outputs of the feature detectors may have time delay circuits connected to them so that they may be read simultaneously with respect to all data passing through the register. This has the considerable advantage in a VLSI implementation of the system of reducing the density of interconnects to the virtual matrix of cells in the shift register to which all the feature detectors (which might number 300 or so) would normally be connected. The construction of the VLSI circuit is therefore made easier even though extra delay circuits are required.

The system may assign a label to all the areas tested by the feature detectors. However, those areas for which there is no appropriate pattern or character class may be assigned the label "space" by being matched best by a reference vector having the label "space" and the least confident confidence measure assigned. This enables the system to function continuously despite the presence of spaces in patterns or text, or of characters for which no reference class or label exists.

Alternatively a threshold confidence measure may be used such that areas having a label assignment which is less confident than a set threshold level are labelled "space". This can help to reduce the chances of misrecognition in certain circumstances.

An embodiment of the present invention will now be described in detail with reference to the following drawings in which.

Figure 1:
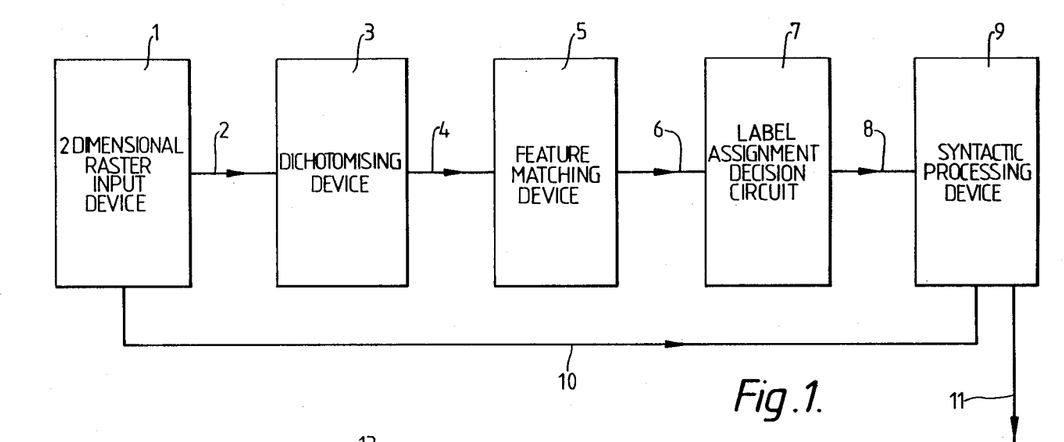
FIG. 1 shows a schematic block diagram of an embodiment of a pattern recognition system according to the present invention.

In FIG. 1 a schematic diagram of an optical character recognition system according to an embodiment of the present invention is shown. A two dimensional raster input device (1) line scans characters on a medium such as paper and transforms the text observed into character video signals. An example of such an input device is a facsimile machine scanner. This may comprise one or more light sensitive devices on which light is focused which has been reflected from the surface of the document on which the text to be recognized is located.

The video signals (2) supplied to the dichotomizing device (3) are converted from grey scale video signals into binary coded video signals comprised of pixels each representing black or white on the original image. Dichotomizing devices which perform this task may involve amplification, thresholding and time sampling circuits and produce a series of "black" or "white" bits corresponding to the horizontal scan line just completed by the photocells.

The binary coded video signals (4) from the dichotomizing device (3) are fed to the feature matching device (5).

The feature matching device (5) tests the binary coded video signals (4) passing through it for the presence of a set of features and the resulting feature responses (6) are passed to the label assignment decision circuit (7). This compares the feature responses with reference vectors and for each feature response assigns a label and confidence measure (8). Finally a syntactic processing device (9) assembles labels, corresponding confidence measures and corresponding positional information (10) derived from the input device (1) about the areas corresponding to the labels, in a buffer. It then decides to output labels and corresponding positional information (11) for those areas of text assigned labels with confidence measures which are greater than (or equal to in certain circumstances), those for neighboring areas in the two dimensional array of areas whose area values are stored in the buffer. The syntactic processing device may also use any other syntactic information available to assist in the assignment and output of labels.

Figure 2:
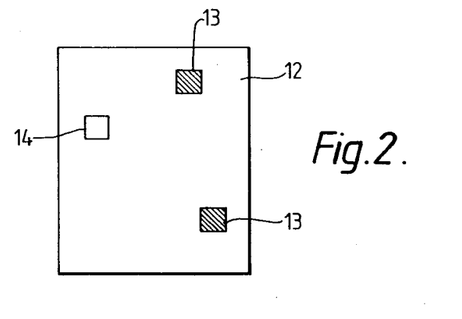
FIG. 2 shows the spatial configuration of the black and white pixels in a feature for use in the system shown in FIG. 1.
Figure 3:
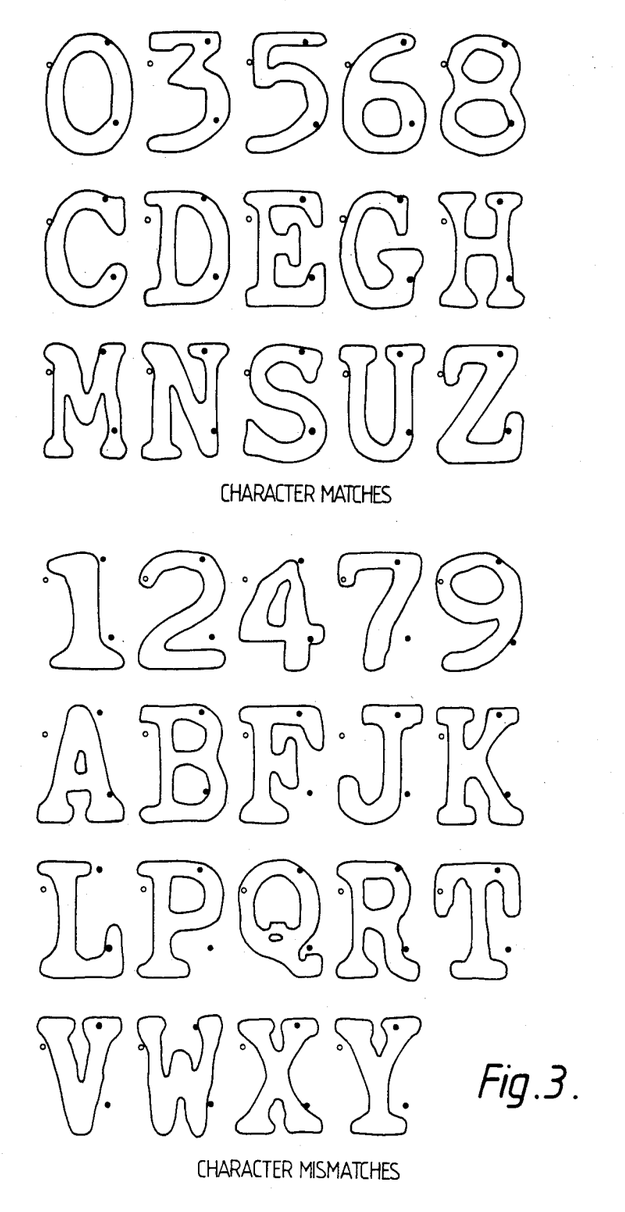
FIG. 3 shows the occurrence of the feature shown in FIG. 2 in 15 character categories and its absence from 19 other categories.

The binary coded video signal produced by dichotomizing device (3) comprises a succession of pixels indicating black or white at a particular point on the scanned image. The object of the feature matching device (5) is to detect the presence or absence of features such as that (12) shown in FIG. 2 in portions of the binary coded video signal corresponding to areas of the scanned image. FIG. 2 shows an example of such a feature (12) comprising two black pixels (13) and one white pixel (14) arranged in a particular spatial configuration. Many other such features are used in a given feature set. How many would be used and what they would consist of depends on the type of recognition task to be carried out. For a typical multi-font optical character recognition task about 300 features would be used each specifying the condition of for example from 1 to 12 pixels. It is important that the configuration of the features used are chosen so that as much information as possible is extracted from the input signal (4). This means that each feature may be present in many pattern categories. This is in contrast to straightforward correlation methods where each feature only exists in one category. The feature shown in FIG. 2 for example is shown to be present in 15 patterns and not present in 19 other patterns in FIG. 3. Feature sets which are suitable for use with the system may be chosen in a number of ways either wholly or partially by intuition or for example by completely automatic means. A suitable method for selecting a feature set and corresponding reference vector set for assignment of a given set of labels is disclosed in "A New Concept in the Design of Automata" by F W M Stentiford (PhD thesis Southampton University 1975). It is important that the feature set used is capable of rejecting inter character misrecognitions caused by contiguous or misaligned characters for the system to be able to operate continuously.

Figure 4:
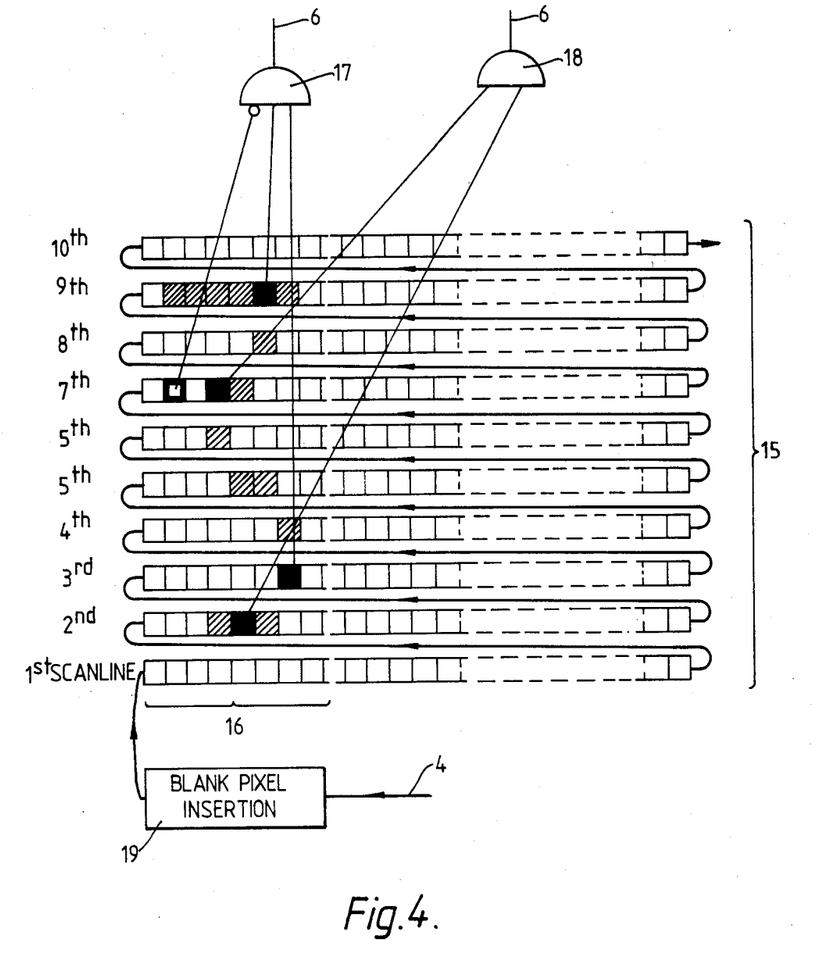
FIG. 4 shows an embodiment of the feature matching device shown in FIG. 1 which detects two features for example.
Figure 5:
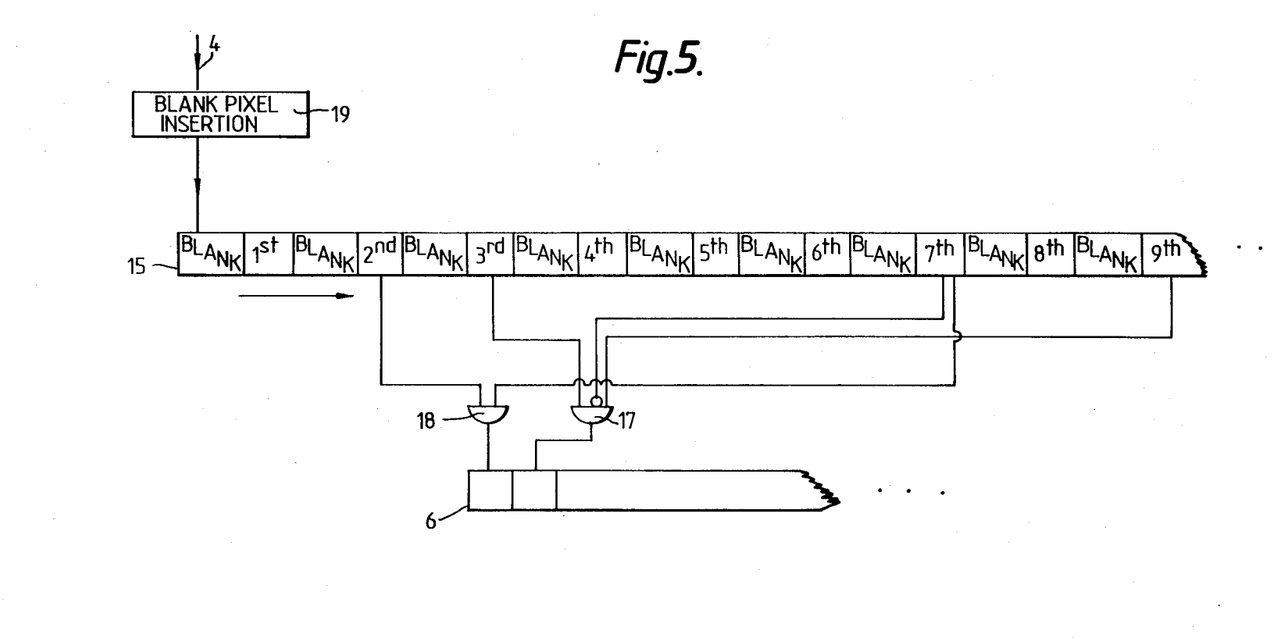
FIG. 5 shows the method of interconnecting shift registers used in the feature matching device shown in FIGS. 1 and 4.

The operation of the feature matching device is shown in FIGS. 4 and 5. The device comprises a long shift register (15) into which the pixels (4) from successive horizontal scan lines of the document are fed. The shift register (15) is arranged as shown in FIG. 4 so that it in effect comprises a matrix which is several pixels deep (for example about 30) and as many pixels wide as the document (for example about 2000) (in FIGS. 4 and 5 only 10 lines of pixels are shown for simplicity). At one end of this matrix is a smaller matrix (16), slightly bigger than the size of the largest character to be recognized, to the cells of which are connected the inputs of the feature detectors (17, 18) only two of which are shown in FIG. 4 for simplicity. The feature detectors may comprise for example AND logic elements. White and black pixels are detected by the use of an inverter on the appropriate input line. Other methods of detection are of course possible as will be apparent to those skilled in the art. The small matrix of cells (16) to which the feature detectors (17, 18) are connected is achieved as shown in FIG. 5 by connecting the feature detector inputs to the appropriate cells of the shift register 15. If it is necessary blank pixels (19) may be inserted at the end of each scan line to avoid "wrap around" effects. In operation pixels (4) are fed in continuously from the scanning means via the dichotomizing means, scan line by scan line. As each new scan line of pixels is entered those already present in effect move one step upwards in the matrix and the effective "window" (16) formed by the feature detector cells is thus scanned over the whole page pixel by pixel in all possible positions.

Figure 6:
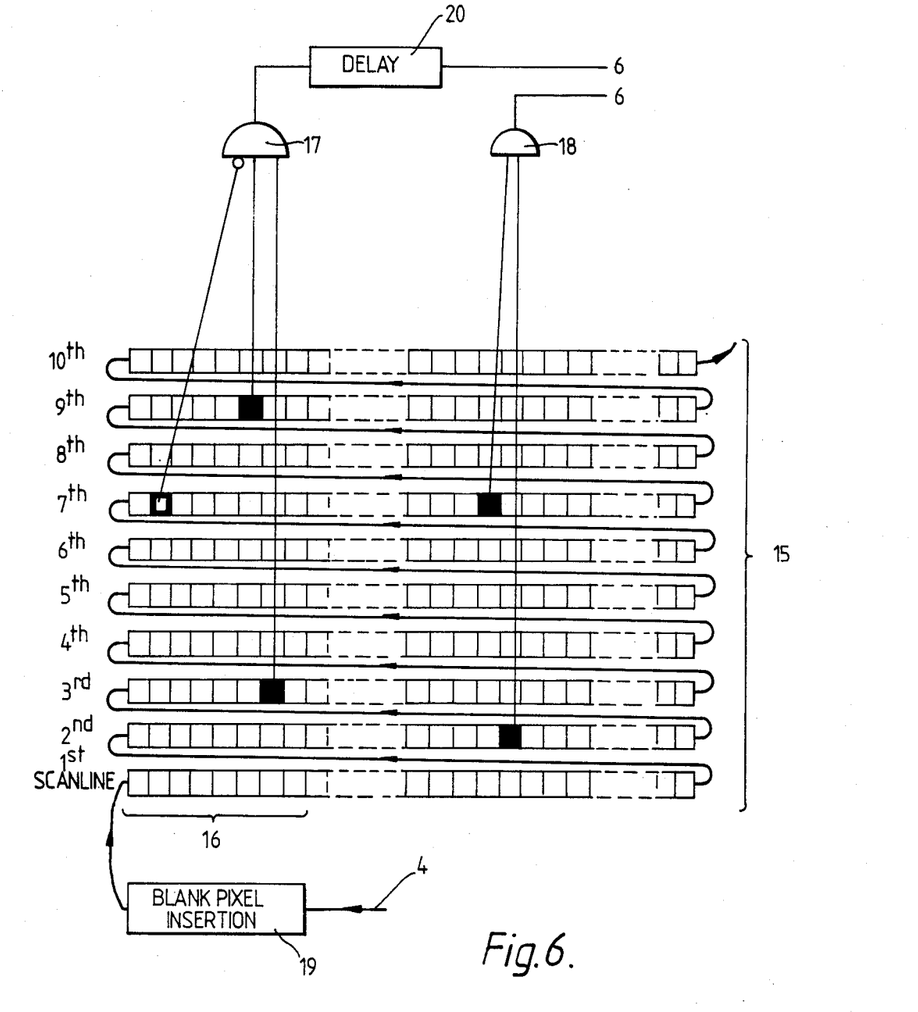
FIG. 6 shows a further embodiment of the feature matching device shown in FIG. 1 which detects two features for example and uses a time delay circuit to read the detectors simultaneously.

In the use of features to recognize characters it may be found impracticable to connect for example 300 feature detectors each comprising from 1 to 12 inputs to a single matrix of feature detector cells (16) which is only for example 30×16 cells big. This is particularly so in custom built VLSI integrated circuit implementations of the system where the density of interconnects to each feature detector matrix cell is preferably kept low. In order to avoid this problem the feature detectors may be connected to other cells in the shift register so that the same features are detected in a portion of data but at a time when the data has moved to a different portion of the shift register. In order for the features thus detected to be detected simultaneously by the label assignment decision circuit (7); time delay circuits (20) may be provided as shown in FIG. 6 so that the features detected at various areas in the 30×2000 array would be fed to the decision circuit simultaneously as if from a set of detectors connected to a single 30×16 array portion (16) of the whole register (the portion 16) shown in FIGS. 5 and 6 is only 10×8 cells big for simplicity). The shift register thus contains a greater number of cells to which feature detectors are connected than would be required if the features were detected simultaneously without the delay circuits. As a result the density of feature detector connections per cell is lower than if the features were detected in a single 30×16 array without using the delay circuits.

The binary outputs (6) from feature logics (17,18) corresponding to each of the features are supplied to the label assignment decision circuit (7).

The label assignment decision circuit (7) compares the outputs (6) simultaneously with a plurality of labelled binary reference vectors as the components of the reference vectors are read out in time parallel fashion from a plurality of registers. On completion of the comparisons the reference vector which most closely matches the binary feature response signal (6) is output together with a measure of confidence in this label. A suitable form of decision circuit which can be used is described in U.S. Pat. No. 4,119,946. Use of such a form of decision circuit and feature detection enables extra features and extra reference vectors to be added to the system or existing ones to be extended quite easily without affecting the arrangement of existing hardware. This is particulary useful in extending the recognition capabilities of the system as new recognition problems are encountered. Due to the parallelism of the recognition process such extension does not necessarily slow down the recognition process which enables the system to work at video speeds even when subsequent hardware extensions are made.

The label and confidence measure information (8) together with positional information (10) giving the location of the corresponding areas of the input pattern to which the labels have been assigned are passed to the syntactic processing device (9). The sequence of tasks performed by syntactic processing device (9) is shown diagrammatically in FIG. 7. The essential task of the syntactic processing device is accomplished by the input of labels L, associated confidence measures d and corresponding positional information comprising X and Y coordinates which define the area of the input pattern to which the label L has been assigned. These area values are stored in a buffer which is then searched after the entry of successive values of $L, (X+1, Y+1)$ and d for maxima in the value of d at $(X,Y)$ with respect to the immediately surrounding areas $(X-1, Y-1)$, $(X, Y-1)$, $(X+1, Y-1)$, $(X, Y+1)$, $(x-1, Y+1)$, $(X+1, Y+1)$, $(X+1, Y)$ and $(X-1, Y)$ such that if the value of d indicates a confidence in the assignment of label L which is greater than the confidence of the immediately surrounding areas or equal to the confidence of the areas $(X, Y-1)$, $(X-1, Y)$ or $(X-1, Y-1)$ in the assignment of their respective labels, the label L and positional information $(X,Y)$ is output from further processing. The condition that the confidence measure may only indicate a confidence equal to three of the eight areas rather than all eight prevents recognitions occurring at points of inflexion in the map of confidence measures.

Figure 8:
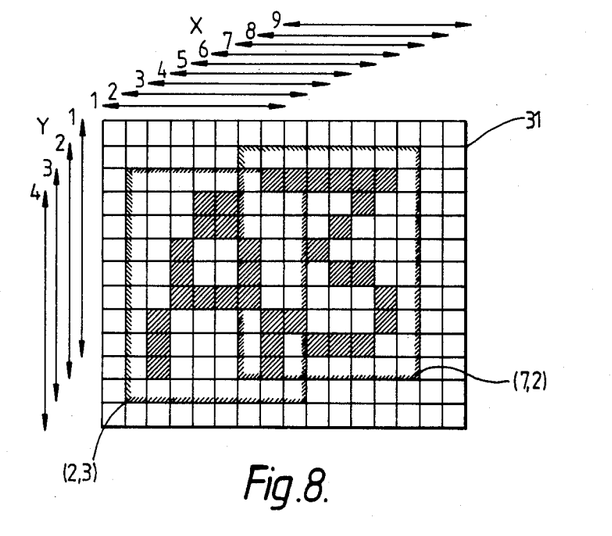
FIG. 8 shows diagrammatically the relationship between the area values in the buffer of the syntactic processing device shown in FIG. 1 and the corresponding areas of text.

The relationship between the original text and the area values in the buffer is shown diagrammatically in simplified form in FIG. 8. The buffer 29 is composed of an array of area values (3) each having label L confidence measure d (where d in this instance is inversely proportional to the amount of confidence in the assignment of label L) and positional information comprising X and Y coordinates. The corresponding area of original text (31) comprises a series of overlapping rectangular areas of text each having corresponding X and Y coordinates and each corresponding in pixel size to the size of the part of the shift register matrix (16) containing the feature detectors (in the embodiment shown in FIG. 4). The areas of text each differ in position from each other by one row of pixels in the binarized form of the text. In operation the feature detectors effectively scan pixels corresponding to successive rows of areas and the decision means then feeds corresponding area values into the buffer. In the buffer (29) shown in FIG. 8 area values for position (3, 4) have just been entered and following that it will be decided that A is to be output for position (2,3). A "3" will already have been output for position (7,2). The inter character contiguities represented by for example positions (4,3) and (4,2) have been assigned the label "space" by the decision means.

Figure 7:
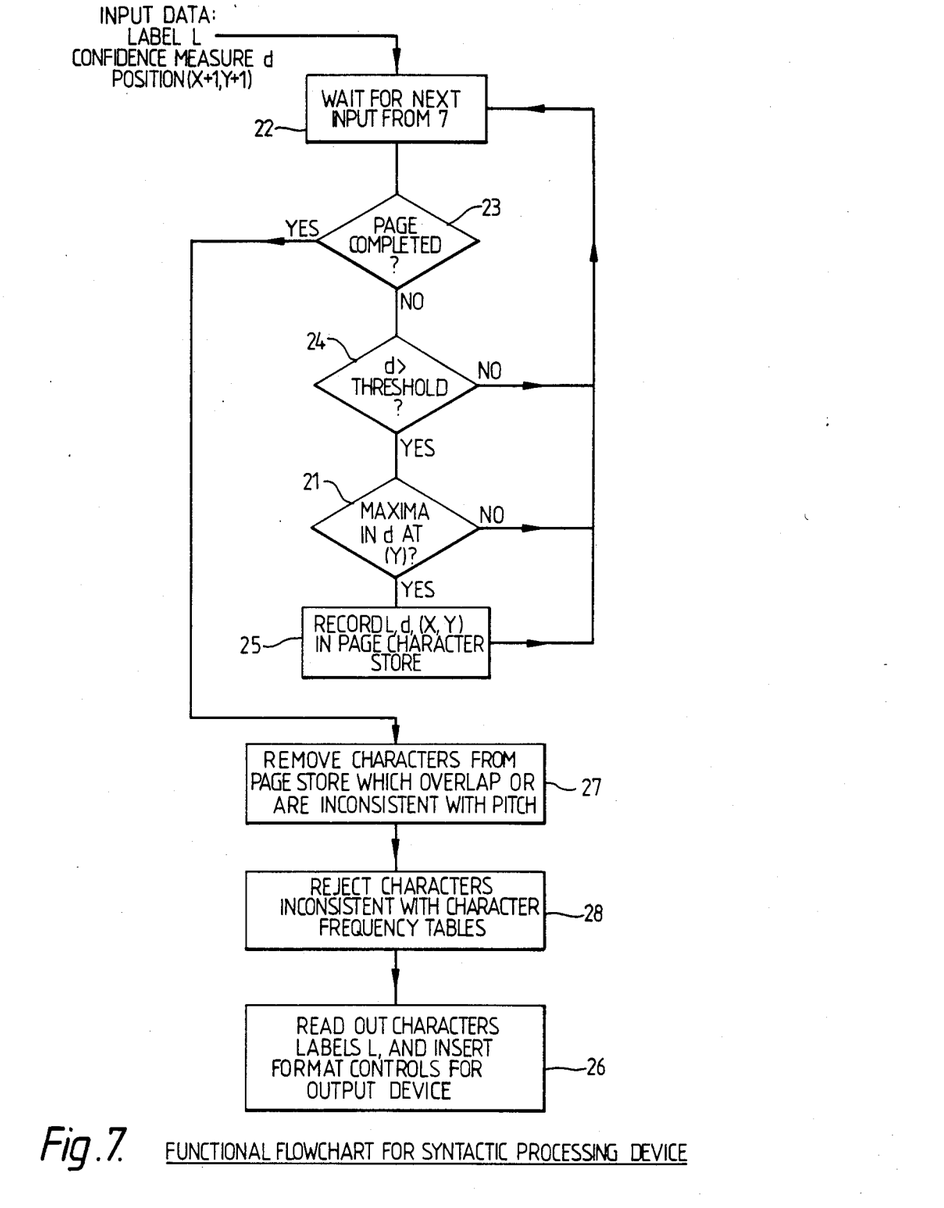
FIG. 7 shows a flow chart of the functions of the syntactic processing device shown in FIG. 1.

The buffer used is large enough to store area values for at least three overlapping scan lines of areas of the document being read. Once area values are no longer needed to make further tests for maxima they may be overwritten by new data. As shown in FIG. 7 in addition to the decision process (21) about the position $(X,Y)$, a number of other functions are performed by the syntactic processing device in this embodiment.

Once the latest area values $L (X+1, Y+1)$ and d have been input (22) the positional information is checked (23) to see whether predetermined limits to the values $(X,Y)$ have been reached indicating that the end of a page has been reached. If this is not so an optional thresholding decision (24) is then made. This rejects any set of area values whose confidence measure d indicates a confidence in the assignment of the associated label L which is less than a set threshold. It is possible to omit this stage and merely allow the decision means to assign the label "space" to any area not assigned a character class label. Those labels L which are output by the decision (21) are then stored (25) together with their confidence measures and positional information in a page character store. Once a complete page has been input as indicated at (23) by the values $(X,Y)$ instructions are sent for the read out (26) of the labels L on an appropriate output device. In this embodiment this step is preceded by two optional syntactic processing steps which remove characters from the page store which overlap or are totally inconsistent with the expected pitch or line spacing (27). Characters are also rejected which are inconsistent with stored syntax rules in the form of character frequency tables appropriate to the language of the page (28). In order to perform these two and possibly other post recognition syntactic processing steps at the same time as the next page is being processed a second page character store may be used to store the page characters during syntactic processing. Characters removed from the page store during syntactic processing are replaced with reject symbols. The syntactic processing steps (27, 28) are preferably switchable out of the system so that variable pitch print documents or documents with unknown characteristics can be processed.

Other syntactic processing steps which may be carried out are spelling checks and elimination of unlikely word adjacencies. The output of labels L at the end of syntactic processing is accompanied by the format controls for the output device to which they are fed which could be for example a word processor.

The entire recognition system including the syntactic processing device and the two dimensional area value buffer and page character stores which carried out the steps and decisions shown in FIG. 7 may be constructed using known electronic circuitry and preferably VLSI circuits. However, the device may be implemented using software. The entire system is particularly amenable to construction using VLSI which combined with the advantages the system has in the way it can operate continuously and without any preprocessing steps gives a pattern recognition system capable of working continuously at high speeds and in particular at video speeds which facilitates numerous applications of the system in addition to use of the system as an optical character page reader.

In its use as an optical character page reader though the system is particularly advantageous in that in operating in a continuous manner every location on a page may be recognized. There is thus no need for segmentation. As a result out of line and out of pitch characters can easily be recognized. Characters forming skewed lines of text with degrees of skew of 1 in 20 can still be recognized quite easily without the need for any complicated preprocessing steps normally needed to cope with such a problem. At the same time the system enables continuous operation without the problems of either being too discriminatory or not discriminatory enough in recognizing characters.

I claim:

1. A pattern recognition system for recognizing plural determined two-dimensional patterns located at different unknown positions within a larger two dimensional image area, said system comprising:

means for the input of electronic data representing a two-dimensional area of digitized pixel areas, each of said pixel areas having a plurality of contiguous pixels corresponding to a portion of said image area which remains unsegmented with respect to the positions of the plural patterns included therewithin to be recognized;

analysis means for analyzing successive potential character-occupying portions of said data associated with each of successive pixel areas of said unsegmented image area and for assigning to each of said pixel areas, in dependence on the corresponding said portion of data, a corresponding one label of a reference set of labels representing one of said predetermined patterns and a corresponding confidence measure indicating a degree of confidence in the assignment of said corresponding one label;

buffer means for storing area values, said area value corresponding to a plurality of said successive overlapping pixel areas forming a two dimensional array of pixel areas, said area values comprising, for each of said neighboring pixel areas, positional information defining the position of the associated pixel area in said two dimensional image and said assigned label and a corresponding confidence measure assigned to the area by said analysis means, and decision means for outputting as electronic signals, labels and positional information corresponding to those pixel areas in said two dimensional array whose corresponding confidence measures indicate a confidence in the correctness of assignment of their corresponding labels which is in a predetermined relationship with that indicated by each of the confidence measures of other members of a two-dimensional overlapping sub-array of neighboring pixel areas within said two-dimensional array, the said relationship being such that the said labels and positional information correspond to those pixel areas whose confidence measures are maxima within each said two-dimensional sub-array.

2. A pattern recognition system according to claim 1 wherein said decision means outputs as electronic signals, labels and positional information corresponding to those areas in said two dimensional array of neighboring areas whose corresponding confidence measures indicate a confidence in assignment of their corresponding labels which is greater than or equal to that indicated by each of the confidence measured corresponding to labels assigned to some members of a two dimensional sub-array of neighboring areas in said array and greater than that indicated by each of the confidence measures corresponding to labels assigned to other members of said two dimensional sub-array of neighboring areas in said two dimensional array.

3. A pattern recognition system according to claim 1 wherein said decision means outputs as electronic signals, labels and positional information corresponding to those areas in said two dimensional array of neighboring areas whose corresponding confidence measures indicate a confidence in the correct assignment of their corresponding labels which is greater than that indicated by each of the confidence measures corresponding to labels assigned to a two dimensional sub-array of neighboring areas in said array.

4. A pattern recognition system according to claim 1 wherein said decision means outputs as electronic signals, labels and positional information corresponding to those areas in said two dimensional array of neighboring areas whose corresponding confidence measures indicate a confidence in the correct assignment of their corresponding labels which is greater than or equal to that indicated by each of the confidence measures corresponding to labels assigned to a two dimensional sub-array of neighboring areas in said array.

5. A pattern recognition system according to any one of the preceding claims wherein said two dimensional sub-array of neighboring areas in said array comprises immediately adjacent overlapping areas in said array of neighboring areas.

6. A pattern recognition system according to claim 1 wherein said two dimensional pattern comprises layers of said areas and said buffer is capable of containing area values corresponding to at least three of said layers of said areas and wherein said positional information specifying the position of said areas in said two dimensional pattern comprises an X coordinate and a Y coordinate for each area.

7. A pattern recognition system according to claim 6 wherein said decision means outputs a label and positional information (X,Y) corresponding to an area if the corresponding confidence measure indicates a confidence in the correct assignment of the label which is greater than that indicated by the confidence measures corresponding to labels assigned to the areas having positions $(X-1,Y+1)$ $(X,Y+1)$ $(X+1,Y+1)$ $(X+1,Y)$ $(X+1,Y-1)$ and which is greater than or equal to that indicated by the confidence measures corresponding to labels assigned to the areas having positions $(X-1,Y-1)$ $(X-1,Y)$ $(X,Y-1)$.

8. A pattern recognition system according to claim 6 or 7 wherein the system is capable of being operated continuously by decisions being made by said decision means in respect of an area (X,Y) in said array immediately area values for adjacent area $(X+1,Y+1)$ have been entered into the buffer by the analysis means; area values for layers Y and Y−1 already being in the buffer.

9. A pattern recognition system according to claim 6 wherein said buffer is capable of containing area values corresponding to at least five of said layers of said areas.

10. A pattern recognition system according to claim 9 wherein said area having corresponding positional information (X,Y) is first chosen by said decision means as being that member of a column of five immediately adjacent areas having the same X coordinate which has the confidence measure indicating the greatest confidence in the correct assignment of its corresponding label, and wherein the next column of five areas to be studied by the decision means following a decision about output in respect of area (X,Y) is centered on area $(X+1,Y)$.

11. A pattern recognition system according to claim 6 wherein said buffer is capable of containing area values corresponding to at least five of said layers of areas and wherein for an area having positional information (X,Y) said sub-array of neighboring areas in said array comprises the areas having positional information $(X\pm1,Y\pm1)$ $(X\pm2,Y\pm2)$ $(X\pm1,Y)$ $(X\pm1,Y\pm2)$ $(X\pm2,Y\pm1)$ $(X\pm2,Y)$ $(X,Y\pm1)$ $(X,Y\pm2)$.

12. A pattern recognition system according to claim 11 wherein the system is capable of being operated continuously by decisions being made by said decision means in respect of an area (X,Y) in said array immediately area values for the area (X+2, Y+2) have been entered into the buffer by the analysis means; area values for layers (Y+1), Y, (Y−1) and (Y−2) already being in the buffer.

13. A pattern recognition system according to claim 1 wherein said analysis means comprises:
   a shift register having a plurality of cells through which said data for said image area is continuously step-wise fed pixel-by-pixel;
   a plurality of feature detectors each for detecting the data content of a set of said register cells;
   means for reading the feature detectors simultaneously at each step of said data through said register; and
   means for comparing the simultaneous readings from each of said feature detectors with predetermined reference vectors each corresponding to a label and assigning that label whose reference vector most closely matches said simultaneous readings together with a corresponding confidence measure to the area corresponding to the data in said register which produced said simultaneous readings.

14. A pattern recognition system according to claim 13 wherein said sets of register cells to which said feature detectors are connected are arranged in said shift register such that said features are detected in a portion of data passing through said shift register at a plurality of different times and wherein said system further comprises time delay circuits connected to the outputs of said feature detectors enabling said feature detectors to be read simultaneously in respect of each portion of data passing through said shift register and wherein said shift register contains a greater number of cells than would be required if said features were detected simultaneously without said delay circuits.

15. An optical character recognition system according to claim 1 wherein optical scanning means provide said electronic data input and any area not assigned a label corresponding to a reference character class is assigned the label "space" and a confidence measure corresponding to the least confident assignment possible.

16. An optical character recognition system according to claim 1 in which all areas having confidence measures indicating less confidence in the assignment of the correct corresponding label than a predetermined threshold confidence level are assigned the label "space".

17. A pattern recognition system in which the relative positions of plural patterns to be recognized within input data are automatically determined as a part of a pattern recognition analysis procedure thereby avoiding the need to preprocess and/or segment the incoming data to initially determine such positions prior to pattern recognition analysis, said system comprising:
   data input means for supplying a continuous stream of digitized binary-valued data representing successive data values of a raster-scanned array of data values containing plural of predetermined patterns therein and with said data values defining a two-dimensional grid of x,y coordinates overlaying said array;
   feature matching means connected to receive said continuous data and to continuously identify the existence of any of N predetermined features located within an area of P×Q data values located at successive X,Y coordinates within said array and to produce an N-dimensional feature vector for each such X,Y coordinate;
   label assignment means connected to continuously receive said N-dimensional feature vectors and to continuously assign one of a predetermined set of M pattern labels to each such feature vector together with an accompanying confidence factor for each such X,Y coordinate; and
   syntactic processing means connected to continuously receive said assigned pattern labels and accompanying confidence factors for each such X,Y coordinate and, by comparing such assigned labels and confidence factors for one X,Y coordinates so as to locate local maxima of confidence factors therein, to output recognized pattern data representing the sequence of predetermined patterns recognized in said array together with their relative position therewithin.

18. A pattern recognition method in which the relative positions of plural patterns to be recognized within input data are automatically determined as a part of a pattern recognition analysis procedure thereby avoiding the need to preprocess and/or segment the incoming data to initially determine such positions prior to pattern recognition analysis, said method comprising the steps of:
   supplying a continuous stream of digitized binary-valued data representing successive data values of a raster-scanned array of data values containing plural of predetermined patterns therein with said data values defining a two-dimensional grid of x,y coordinated overlaying said array;
   continuously identifying the existence of any of N predetermined features located within an area of P×Q data values located at successive X,Y coordinates within said array and producing an N-dimensional feature vector for each such X,Y coordinate;
   continuously assigning one of a predetermined set of M pattern labels to each such feature vector together with an accompanying confidence factor for each such X,Y coordinate; and
   continuously receiving said assigned pattern labels and accompanying confidence factors for each such X,Y coordinate and, by comparing such assigned labels and confidence factors for one X,Y coordinate to those associated with neighboring X,Y coordinates so as to locate local maxima of confidence factors, outputting recognized pattern data representing the sequence of predetermined patterns recognized in said array together with their relative positions therewithin.

* * * * *